United States Patent [19]
Chen et al.

[11] Patent Number: 5,473,725
[45] Date of Patent: Dec. 5, 1995

[54] METHOD AND DEVICE FOR CONTROLLING THE SPEED OF THE BRUSHLESS DC MOTOR PROVIDED FOR AN ELECTRIC VEHICLE

[75] Inventors: Tshaw-Chuang Chen; Hong-Shi Chang; Huan-Jen Yang; Yaw-Shih Shieh, all of Hsinchu, Taiwan

[73] Assignee: Industrial Technology Research Institute, Hsinchu, Taiwan

[21] Appl. No.: 261,540

[22] Filed: Jun. 17, 1994

[51] Int. Cl.$^6$ ................................................ H02P 5/06
[52] U.S. Cl. .................... 318/254; 388/815; 388/910; 388/928.1
[58] Field of Search .................................. 318/254, 138, 318/439; 388/809–823, 911, 910, 928.1

[56] References Cited

U.S. PATENT DOCUMENTS

| | | | |
|---|---|---|---|
| 4,528,485 | 7/1985 | Boyd, Jr. | 318/254 X |
| 4,528,486 | 7/1985 | Flaig et al. | 318/254 |
| 4,743,815 | 5/1988 | Gee et al. | 318/254 |
| 4,857,814 | 8/1989 | Duncan | 318/254 X |
| 5,023,527 | 6/1991 | Erdman et al. | 318/254 |
| 5,187,419 | 2/1993 | DeLange | 318/254 X |

*Primary Examiner*—David S. Martin
*Attorney, Agent, or Firm*—W. Wayne Liauh

[57] ABSTRACT

The speed of a brushless DC motor driving an electric vehicle is controlled with a speed feedback signal proportional to rotation speed of the motor by processing the back electromotive force (EMF) waves of the brushless DC motor. In this method, the back EMF waves of plural phases are taken to pass the differential amplifiers for each phase, and the back EMF signals in the rising and falling regions of the back EMF waves of each phase are obtained to synthesize, by the commutation signals of a magnetic pole sensor passing the phase detecting circuit, after full-wave rectification and low-pass filtering, a [speed feedback signal. This method differs from normal speed control of a motor, in which a speed feed-back element such as a DC tachometer or an encoder is necessary for controlling the speed. This invention permits the brushless DC motor to control the speed without a feedback element such as a DC tachometer or an encoder, thereby decreasing the cost of the brushless DC motor speed control system.] positive analog voltage is obtained and then maintained or converted to a positive or negative analog voltage by detecting the rotating direction of the motor by the commutation signals, as a speed feedback signal.

2 Claims, 6 Drawing Sheets

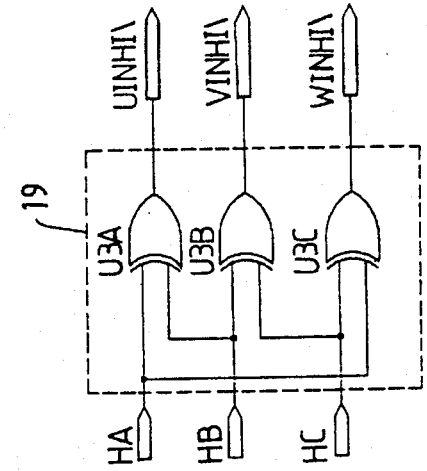
FIG.6A
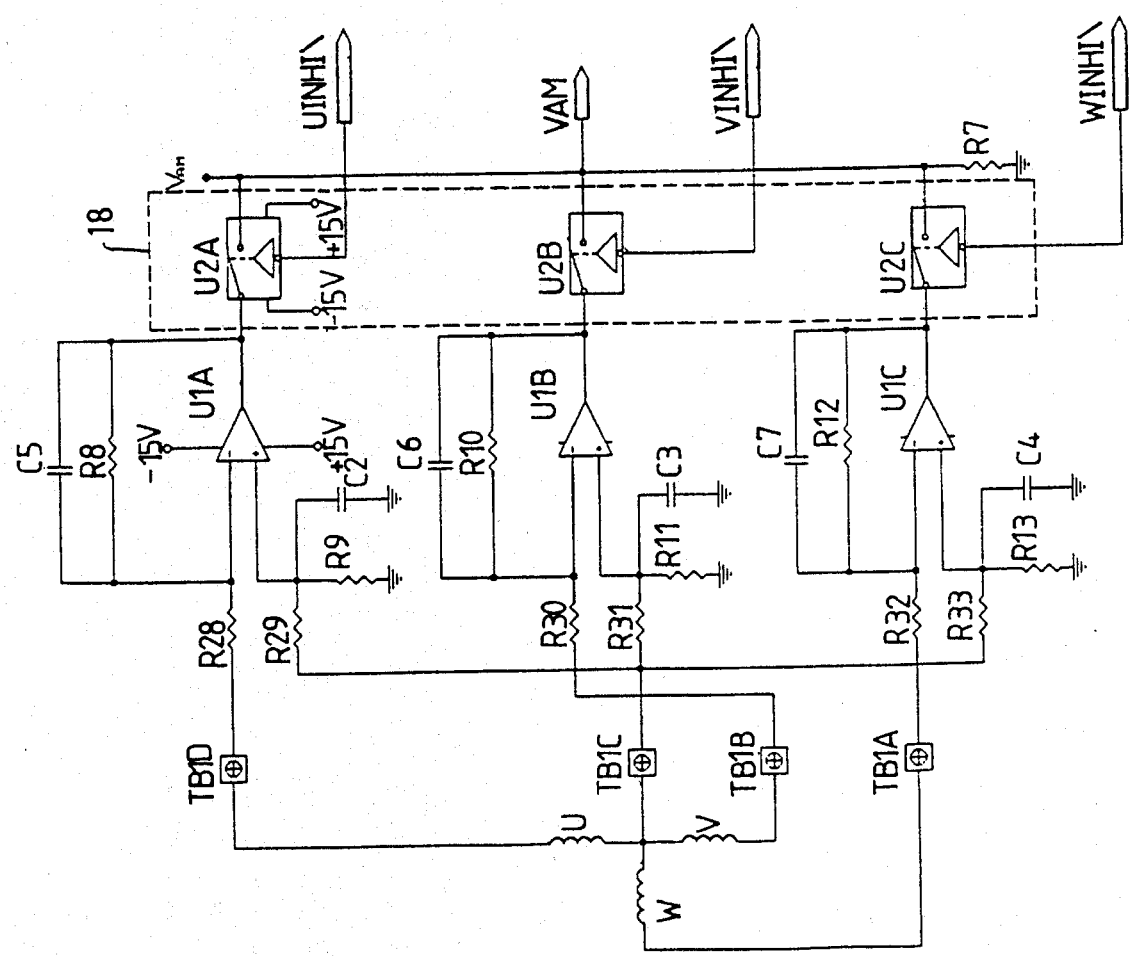

METHOD AND DEVICE FOR CONTROLLING THE SPEED OF THE BRUSHLESS DC MOTOR PROVIDED FOR AN ELECTRIC VEHICLE

BACKGROUND OF THE INVENTION

This invention relates to a method and device for controlling the speed of a brushless DC motor provided for an electric vehicle, particularly to a method and device for controlling the speed of a brushless DC motor which processes the back EMF waves of the motor to obtain a speed feedback signal proportional to rotation speed of the motor, and which needs no speed feedback elements.

Generally, to control the speed of a brushless DC motor, it is necessary to install a DC tachometer or an encoder or the brushless DC motor as a speed feedback element. If using a DC tachometer as a speed feedback element, the feedback signal can enter into a speed compensator with an analog rotation speed command voltage. If using an encoder as a speed feedback element, the input signal, being a pulse train, must first be changed to an analog voltage through a Frequency to Voltage Converter. It then enters the speed compensator with the analog rotation speed command voltage synchronously. It is necessary to install a speed feedback element to the brushless DC motor when using these two methods to control the speed. But when being applied under some circumstances, for instance, to automatically guided vehicles and electric vehicles, though it is necessary to control the speed, a larger speed fluctuation can be tolerated. According to the above, the inventor's design provides a method and device for controlling the speed of a brushless DC motor provided for an electric vehicle. This method and device can be adapted to electric vehicles powered by batteries of 24 V, 48 VDC etc., and will decrease the production cost of electric vehicles.

SUMMARY OF THE INVENTION

The speed feedback signal of the invention for controlling speed is obtained by taking and processing the back EMF waves to get the speed feedback voltages proportional to rotation speed of the motor. An objective of this invention is to obviate the necessity for installation of a speed feedback element to control the speed of a brushless DC motor provided for an electric vehicle, thereby decreasing the system's cost.

The method of this invention for controlling the speed of a brushless DC motor provided for an electric vehicle is to obtain the speed feedback signal proportional to the rotation speed of the motor by processing the back EMF waves of the brushless DC motor. This method takes in the following steps: taking the back EMF waves of each phase to pass the differential amplifiers for each phase, and taking the back EMF signals in the rising and falling regions of the back EMF waves of each phase to synthesize, by the commutation signals of the magnetic pole sensor through a phase detecting circuit, after full-wave rectification and low-pass filtering, a positive analog voltage; further, passing said positive analog voltage through feedback signal polarity analog multiplexer, by the commutation signals of the magnetic pole sensor through a motor rotating direction detecting circuit, to obtain a positive or negative analog voltage to be used as speed feedback signal to attain the goal of controlling the motor's speed.

The device of this invention for controlling the speed of a brushless DC motor provided for an electric vehicle comprises:

a plurality of differential amplifiers, through which the back EMF waves taken from the input terminal of a motor can become the valid-level voltages and low-pass filtered waves;

a back EMF analog multiplexer for synthesizing the back EMF signals taken from the rising and falling regions of the back EMF waves of each phase;

a phase detecting circuit for controlling the operating time of the back EMF analog multiplexer based on the control signals responsive to each phase, which are generated by inputting the commutation signals of the magnetic pole sensor;

an absolute value circuit for full-wave rectification of the AC signals taken from the back EMF analog multiplexer;

a low-pass filter, through which the output of the absolute value circuit will be low-pass filtered and become a smooth positive DC voltage proportional to the rotation speed of the motor;

a motor rotating direction detecting circuit to detect the rotating direction of the motor by checking the phase relationship of the commutation signals from the magnetic pole sensor;

a feedback signal polarity analog multiplexer for generating a positive or negative analog voltage to be used as speed feedback signal by inputting the positive analog voltage from the low-pass filter according to the rotating direction of the motor detected by the motor rotating direction detecting circuit; and a speed compensator, which is a proportional amplifier for controlling the voltage supplied to the brushless DC motor by the speed commands and speed feedback signals passing the proportional amplifying compensator;

BRIEF DESCRIPTION OF THE DRAWINGS

In the appending drawings:

FIG. 6A and 6B show the circuitry for controlling the speed of the brushless DC motor.

DETAILED DESCRIPTION OF THE PREFERRED EMBODIMENT

Figure 1:
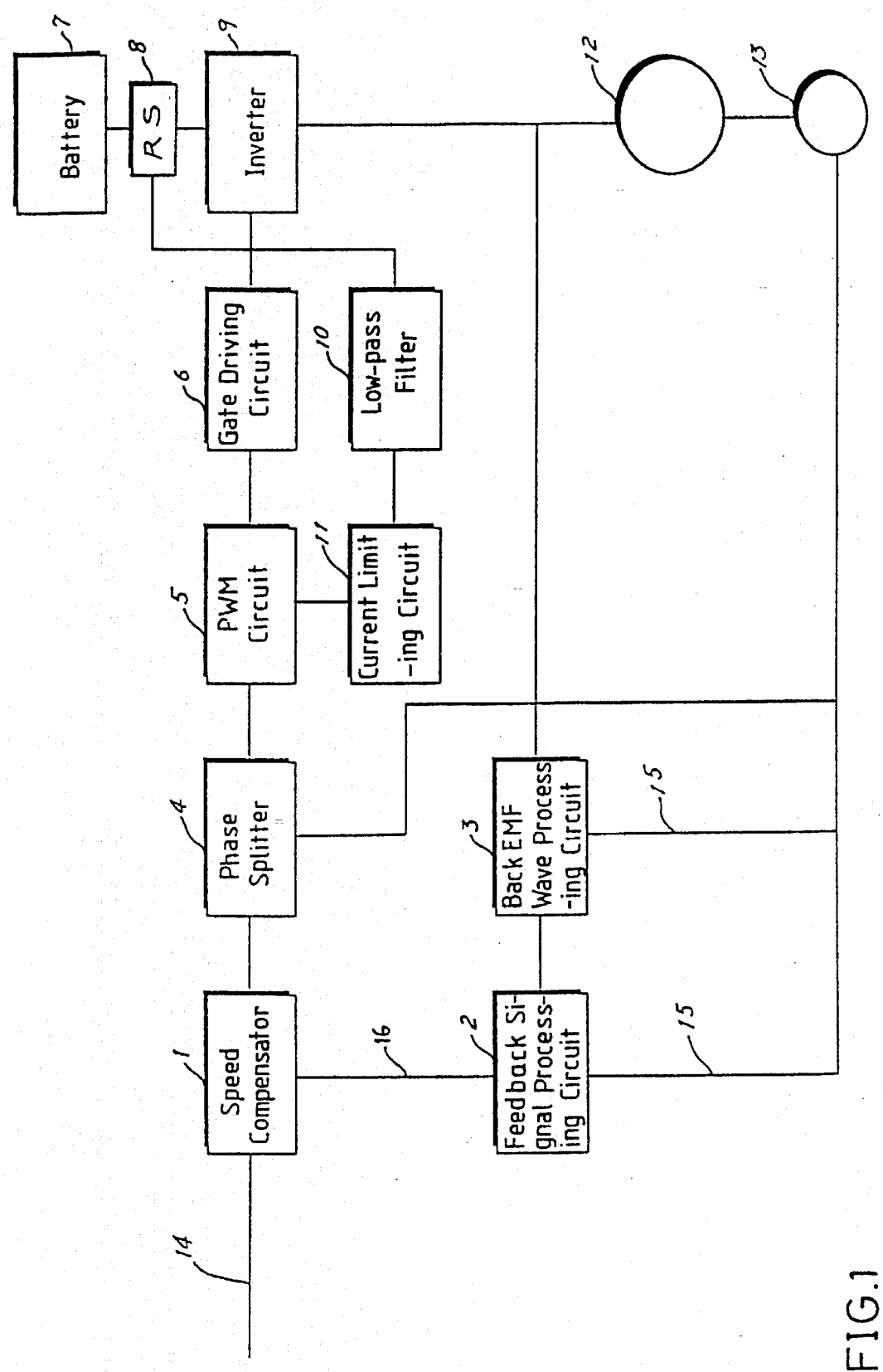
FIG. 1 is a block diagram of the control of a brushless DC motor provided for an electric vehicle.
Figure 2:
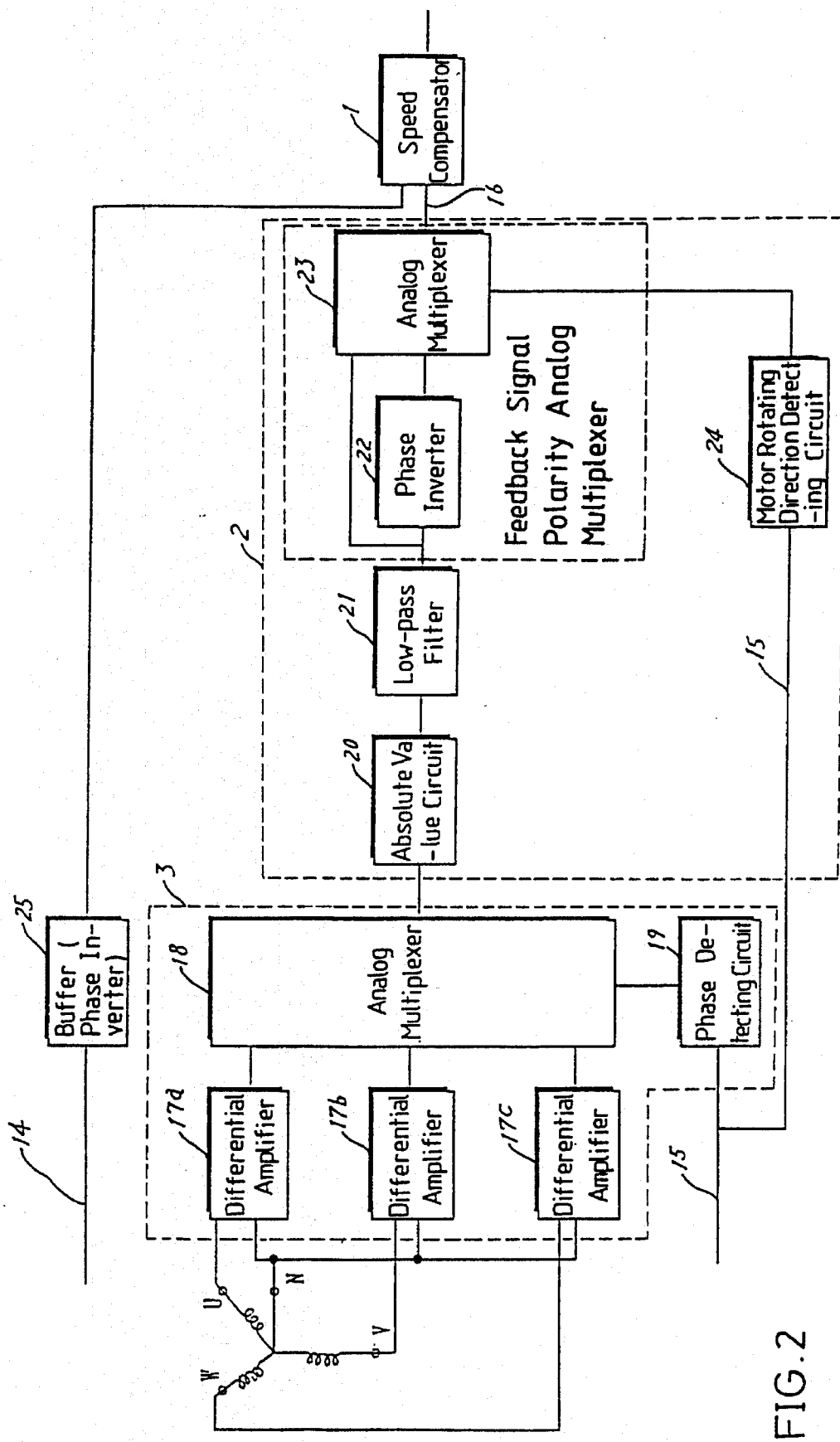
FIG. 2 is a block diagram of the speed control of a brushless DC motor.

The embodiment of this invention will be described with the drawings for reference. In FIG. 1, which is a block diagram of the control of a brushless DC motor, 1 is a speed compensator, 2 is a feedback signal processing circuit, 3 is a back EMF wave processing circuit, 4 is a phase splitter, 5 is a pulse-width modulation (PWM) circuit, 6 is a gate-driving circuit, 7 is a battery, 8 is a shunt, 9 is an inverter, 10 is a low-pass filter, 11 is a current-limiting circuit, 12 is a brushless DC motor, 13 is a magnetic sensor, 14 indicates the speed command input, 15 indicates the magnetic pole sensor signal input, and 16 indicates the speed feedback signals. The device of this invention, constituted a speed controller, is by the speed compensator 1, the feedback signal processing circuit 2 and the back EMF wave processing circuit 3. These three parts are shown in FIG. 1. The block diagram of the circuits for these three parts is shown in FIG. 2.

The conventional parts of the brushless DC motor are described in FIG. 1 where the phase splitter 4 is used to determine which power transistors in the inverter 9 are to be activated based on the commutation signal 15 from the magnetic pole sensor 13, so as to allow the battery 7 to be supplied to the brushless DC motor 12. The current limiting circuit 11 is used to limit the current flowing through the brushless DC motor 12. When the current reaches an upper limit, the duty cycle of the pulses from the PWM circuit 5 will be limited.

Figure 3:
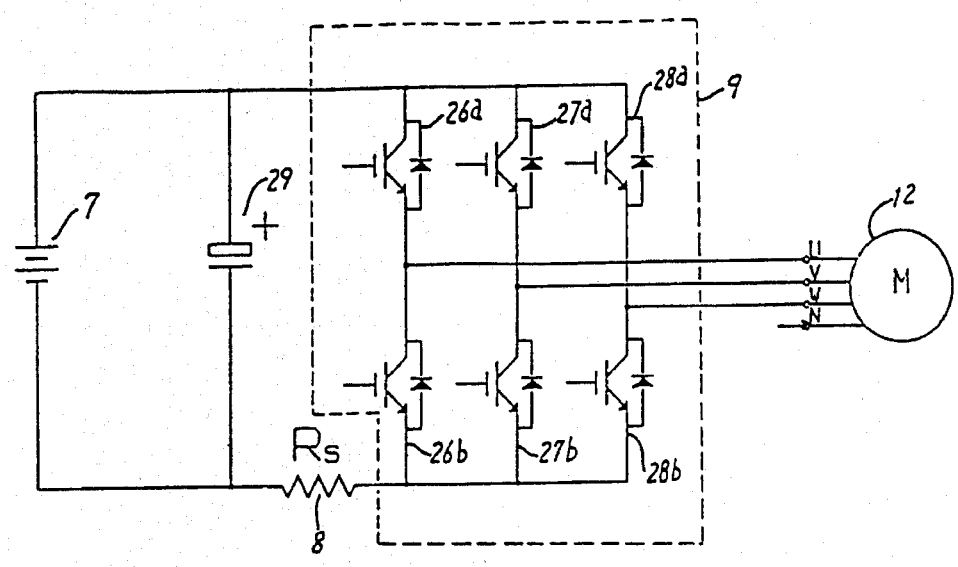
FIG. 3 shows the back EMF waves for controlling the speed of the brushless DC motor provided for an electric vehicle detected from the posit ions U, V, W, N, and shows the construction of the inverter.

In this embodiment, the three phases of the brushless DC motor are connected with each other a Y-connection, the positions U, V, W, N detected from the back EMF waves for controlling the speed of the brushless DC motor are shown in FIG. 3, wherein N is a neutral point. In FIG. 2, the back EMF wave processing circuit 3 comprising differential amplifiers 17a, 17b, 17c connected to the three phases U, W, V individually, then connected to the analog multiplexer 18 and phase detecting circuit 19; while the feedback signal processing circuit 2 comprising an absolute value circuit 20, a low-pass filter 21, a phase inverter 22, an analog multiplexer 23, and a motor rotating direction detecting circuit 24; the speed command signal input 14 applied to the speed compensator 1 passes a buffer (or a phase inverter) 25 previously.

As shown in FIG. 3, the currents for three phases of the brushless DC motor 12 are decided by whether the control switches 26a, 26b, 27a, 27b, 28a, 28b of the inverter 9 are turned on, and the positions detected from the back EMF waves for controlling the speed are shown as U, V, W, N in this figure, and 29 in this figure is a capacitor.

Figure 4:
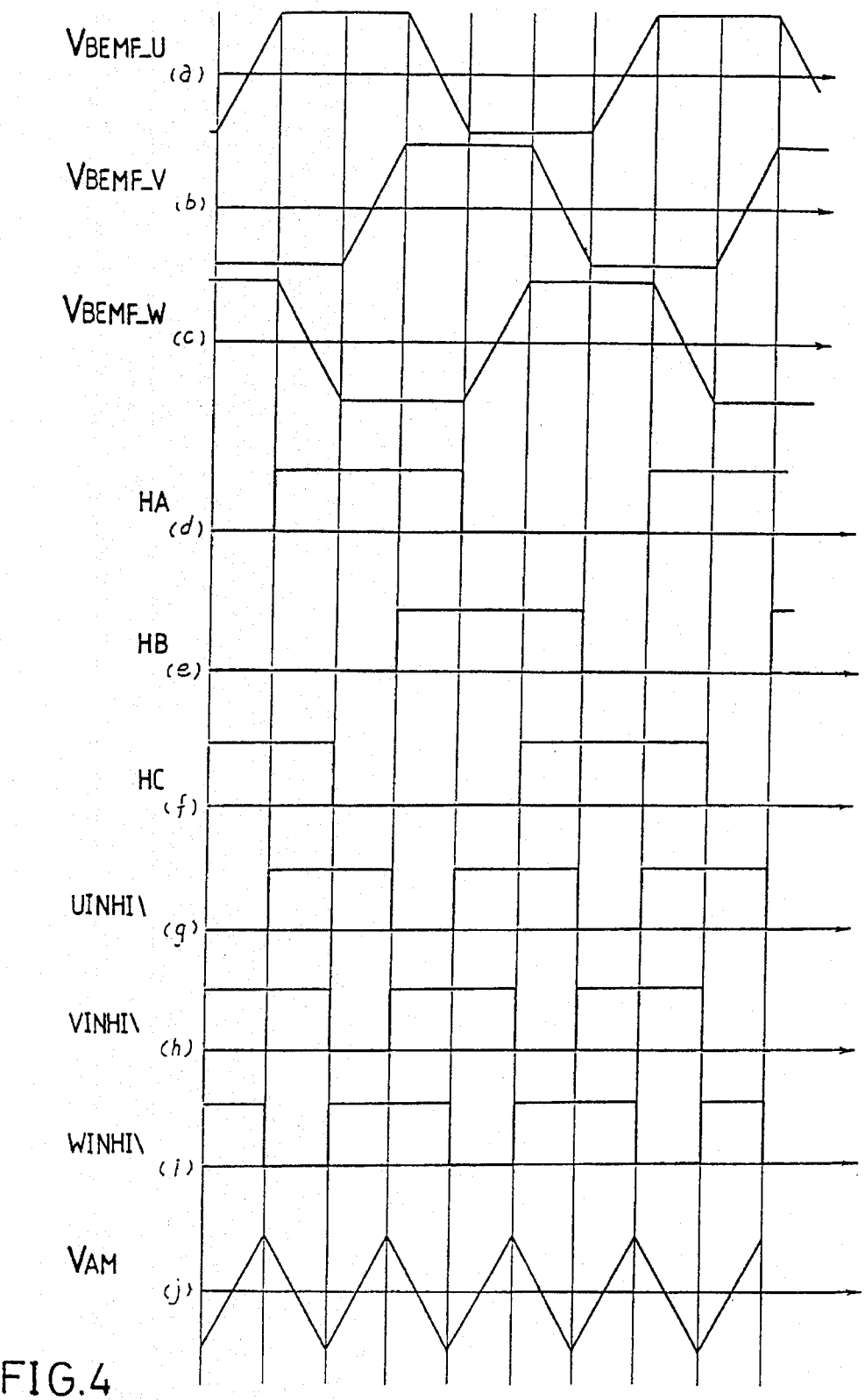
FIG. 4 shows the back EMF waves of the motor and the commutation signals.

The back EMF waves of the three phase brushless DC motor of each phase are shown in FIG. 4 (a), (b), (c) individually, the flat part of each back EMF represents the 120 degrees electrical angle, two of the coils of the phases are conducted at any instant when controlling the brushless DC motor, the interval of conduction is taken to be the flat part of the back EMF to generate the maximum torque according to the magnetic pole sensor signal. To obtain the speed feedback signal, this device takes the back EMF waves of each phase from the input terminals of U, V, W, N of the brushless DC motor, and makes them pass the differential amplifiers 17a, 17b or 17c to get the valid level back EMF waves of each phase as shown in FIG. 2, and adopts the commutation signals of the magnetic pole sensor, making them pass the phase detecting circuit 19 to get the rising and falling regions of the back EMF waves of each phase, wherein the three phases brushless DC motor the rising regions and falling regions of the back EMF being 60 degrees electric angle respectively. Then it selects the signals in the rising and falling regions of the back EMF wave approaching a triangular wave shown in FIG. 4 (j); the wave then enters into an absolute value circuit 20 of the next stage. FIGS. 4 (d), (e), (f) show the commutation signals when the brushless DC motor is rotating clockwise, and the signal of the back EMF waves obtained through the analog multiplexer 18 when the up and down power element switches 26a, 26b of the U-phase of the inverter 9 in the driver of the brushless DC motor are both turned off are shown in FIG. 4 (g), $$UINHI\backslash = \overline{A}B + A\overline{B}$$

It is further possible to propagate the rising and falling signals of the back EMF's to the next stage through the analog multiplexer 18 when the signal UINHI\ is in low state because the control of the analog multiplexer constituted of three analog switches in this stage is low active for the same reason, the V-phase back EMF signal is controlled by the signal VINHI\ shown in FIG. 4 (h), while $$VIHNI\backslash = \overline{B}C + B\overline{C}$$

and the W-phase back EMF signal is controlled by the signal WINHI\ shown in FIG. 4 (i), while $$WINHI\backslash = \overline{C}A + C\overline{A}$$

Therefore, the output of the analog multiplexer 18 is the triangular wave signal synthesized by the rising and falling regions of the back EMF signals of three phases. The triangular wave signal wall becomes a back EMF signal being full-wave rectified through an absolute value circuit 20, then the back EMF signal will become an positive analog speed voltage proportional to the rotation speed of the brushless DC motor through a low-pass filter 21.

Figure 5:
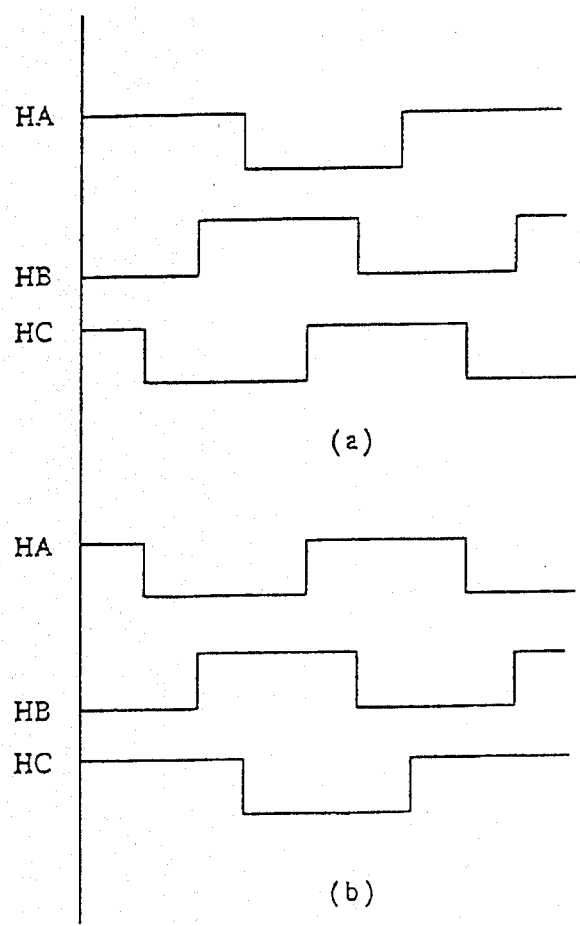
FIGS. 5 (a) and (b) show the commutation signals individually when the motor rotates clockwise (CW) and counterclockwise (CCW)

But under some circumstances, the brushless DC motor rotates bidirectionally, and then it needs positive and negative analog speed feedback voltages for negative feedback control. The commutation signals of the magnetic pole sensor when the brushless DC motor rotates clockwise (CW) and counter-clockwise (CCW) are shown in FIG. 5, wherein (a) shows the commutation signal when rotating clockwise and (b) shows the commutation signal when rotating counterwise. These signals enter into a motor rotating direction detecting circuit 24 to generate a control signal to control the positive or negative analog voltage, to be used as speed feedback signal to enter the speed compensator 1 via the analog multiplexer 23 because the phase relationship of the commutation signals are different when motor rotates clockwise and counter-clockwise. The speed compensator 1 is a proportional amplifier. The input signals of the proportional amplifier are the speed command 14 and speed feedback signal 16 individually. A control signal generated by the proportional amplifier can be provided to control the voltage supplied to the brushless DC motor.

Figure 6B:
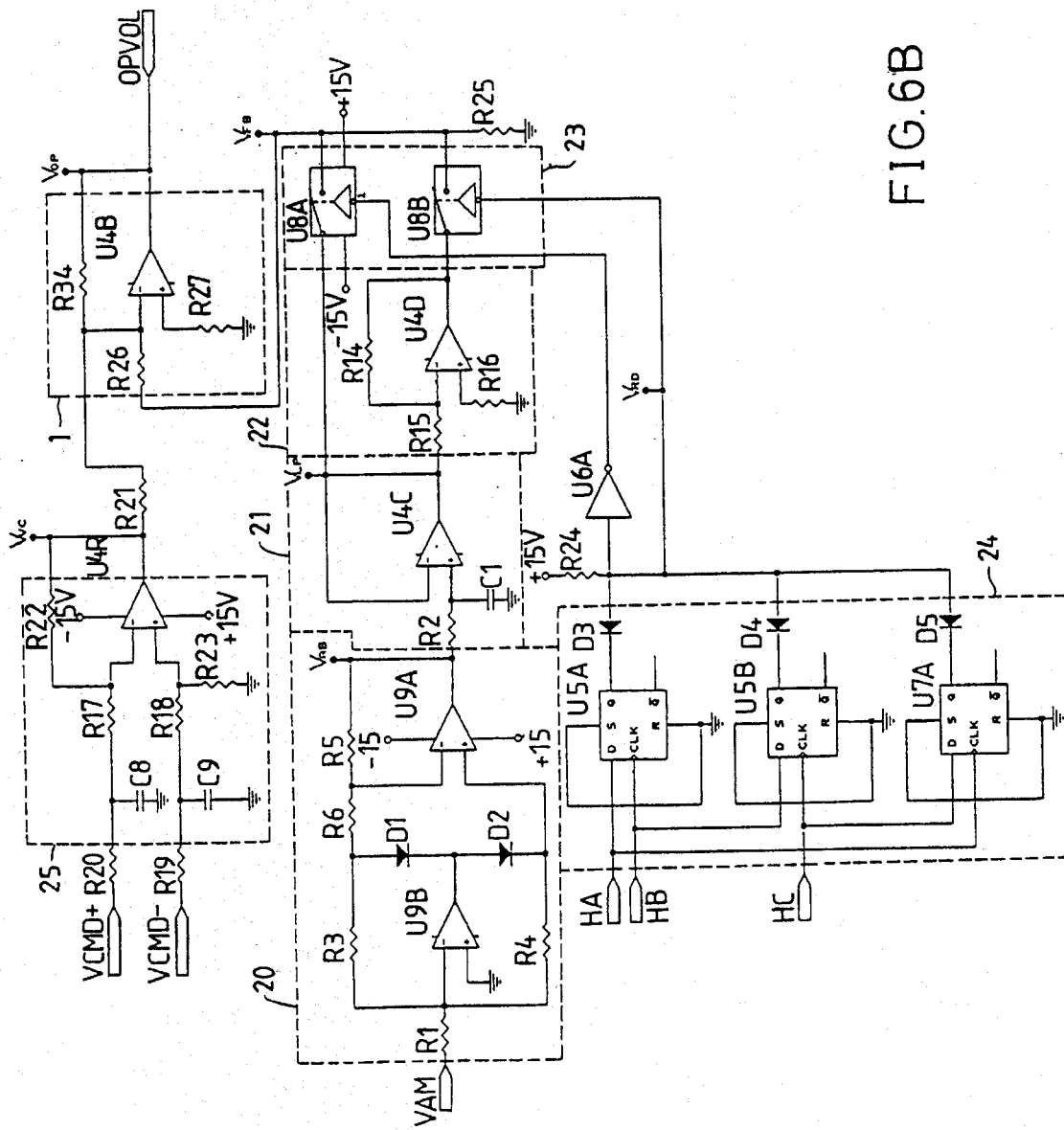

FIGS. 6A and 6B show the circuitry of the embodiment of the method and device for controlling the speed of the brushless DC motor of this invention, and a block diagram thereof is shown in FIG. 2. The Y-connection of the three phases in the brushless DC motor of the device has a neutral point N, and the back EMF's of the three phases U, V, W of the motor are obtained individually from TB1D, TB1B, TB1A and processed individually through the differential amplifiers U1A, U1B, U1C in the back EMF processing circuit. Now we only describe the U phase, wherein R28= R29, R8=R9, C2=C5, then the gain is R8/R28, the low-pass filter cut-off frequency is $$fc = \frac{1}{2\pi R8C5}$$

U2 is the analog multiplexer 18 constituted of three analog switches U2A, U2B, U2C, wherein the signal UINHI\=A$\overline{B}$+$\overline{A}$B which is generated by the commutation signal passing an exclusive-OR gate U3A into the phase detecting circuit 19 is provided to control the analog switch U2A to take the back EMF wave to pass the analog multiplexer 18 when the up and down power elements 26a, 26b of the U-phase of the inverter in the driver of the brushless DC motor are both turned off. For the same reason, the signal $\overline{VINHI}=\overline{BC}+BC$ which is generated by the commutation signal passing an exclusive-OR gate U3B in the phase detecting circuit 19 is provided to control the analog switch U2B to take the back EMF wave signal to pass the analog multiplexer 18 when the up and down power elements 27a, 27b of the V-phase of the inverter in the driver of the brushless DC motor are both turned off. The signal $\overline{WINHI}=\overline{CA}+\overline{C}A$, which is generated by the commutation signal passing an exclusive-OR gate U3C in the phase detecting circuit 19, is provided to control the analog switch 2C to take the back EMF wave signal to pass the analog multiplexer 18 when the up and down power elements 28a, 28b of the W-phase of the inverter in the driver of the brushless DC motor are both turned off.

The triangular wave AC signal synthesized by the rising and falling regions in the back EMF signals of three phases of the VAM output from the multiplexer 19 is shown in FIG. 4 (j).

The absolute value circuit 20 which is constituted by U9A and U9B can generate the effect of full-wave rectification having no phase inversion and having R3/R1 as a gain thereof when R3=R4=R5=R6. For the input signal VAN, the output of VAB of the absolute value circuit 20 is proportional to the absolute value of the input |VAM|.

If U4C, R2 and C1 comprise a low-pass filter 21, whose cut-off frequency is fc=½πR2C1, then the positive analog voltage proportional to the rotation speed of the motor is obtainable.

There must be negative feedback to control the speed. In other words, the speed feedback voltage VFB is a positive analog voltage when the motor rotates clockwise (CW), and VFB is a negative analog voltage when the motor rotates counter-clockwise (CCW). But when the speed feedback voltage VLP obtained from the back EMF wave processing circuit 3 (please refer to FIG. 1 and 2) is positive DC analog voltage proportional to rotation speed of the motor, we add a motor rotating direction detecting circuit 24 made up of U5A, U5B and U7A, the output VRD of which is in high state when the motor rotates clockwise, enabling the analog switch U8A in the analog multiplexer 23, the VFB=VLP, which can be represented by the following equation:

$$VFB = \begin{cases} VLP \text{ when } VRD \text{ is in "high" state} \\ -VLP \text{ when } VRD \text{ is in "low" state} \end{cases}$$

The circuit U4D in the figure is the phase inverter 22.

The speed compensator 1 of the circuit U4B is a proportional amplifier, whose output voltage is:

$$VOP = -\left( \frac{R34}{R21} Vvc + \frac{R34}{R26} VFB \right)$$

which is provided to control the voltage supplied to the brushless DC motor. The circuit U4A in this figure is the buffer 25.

The method and device of this invention for controlling the speed of a brushless DC motor provided in an electric vehicle takes the back EMF waves of the brushless DC motor to process and obtain the speed feedback signal proportional to the rotation speed of the motor. Thus it is not necessary to install a speed feedback element and without a costly speed feedback element the cost of the speed control system of a brushless DC motor is greatly decreased.

This invention has been described by the embodiment contained herein, but it should be evident that various changes of form or amendments which are not contradictory to the broadly defined spirit and viewpoints of the claims attached to the invention should all be contained in the range of this invention.

What is claimed is:

1. A device for controlling a speed of a brushless DC motor provided in an electric vehicle, the brushless DC motor being rotatable in a unidirection and having a plurality of phases to generate back electromotive force (EMF) waves from a respective winding of said motor when in rotation, the device comprising:

A phase inverter for inverting an input speed command;

a plurality of differential amplifiers, through which the back EMF waves are taken from respective input terminals of the motor, so as to obtain valid level voltages and low-pass filtered waves;

a back EMF analog multiplexer for synthesizing the back EMF signals taken from the rising and falling regions of the back EMF waves of each phase;

a phase detecting circuit for controlling the operating time of the back EMF analog multiplexer based on control signals responsive to each phase generated by inputting commutation signal of a magnetic pole sensor;

an absolute value circuit for full-wave rectification of art AC signal taken from the back EMF analog multiplexer;

a low-pass filter for low-pass filtering an output of the absolute value circuit to generate a smooth positive DC voltage proportional to a rotation speed of the motor, said smooth positive DC voltage is to be used as a feedback signal; and a speed compensator, which is a proportional amplifier, for controlling the voltage supplied to the brushless DC motor by amplifying a voltage in a proportional manner difference between the inverted speed command and the feedback signal.

2. A device for controlling a speed of a brushless DC motor for driving an electric vehicle, the brushless DC motor being rotatable in bidirection and having a plurality of phases to generate back electromotive force (EMF) waves from a respective winding of said motor when in rotation, said device comprising:

A phase inverter for inverting an input speed command a plurality of differential amplifiers, through which the back EMF waves are taken from input terminals of the motor to obtain valid level voltages and low-pass filtered waves:

a back EMF analog multiplexer for synthesizing the back EMF signals taken from the rising and falling regions of the back EMF waves of each phase;

a phase detecting circuit for controlling the operating time of the back EMF analog multiplexer based on control signals responsive to each phase generated by inputting commutation signals of a magnetic pole sensor;

an absolute value circuit for full-wave rectification of an AC signal taken from the back EMF analog multiplexer;

a low-pass filter for low-pass filtering the output of the absolute value circuit to a smooth positive DC voltage which is proportional to the rotation speed of the motor; and a motor rotating direction detecting circuit for detecting a rotating direction of the motor by checking the phase relationship of the commutation signals from the magnetic pole sensors;

a feedback signal polarity analog multiplexer for generating a positive or negative analog voltage, which is to be used as a speed feedback signal, based on the positive analog voltage output from the low-pass filter according to the rotating direction of the motor detected by the motor rotating direction detecting circuit; and a speed compensator, which is a proportional amplifier, for controlling the voltage supplied to the brushless DC motor by amplifying a voltage difference between the inverted speed command and the feedback signal in a proportional manner.

* * * * *